US006267363B1

(12) United States Patent
Genequand et al.

(10) Patent No.: US 6,267,363 B1
(45) Date of Patent: Jul. 31, 2001

(54) FLEXIBLE PIVOT WITH INTERNAL PIVOTING AXIS

(75) Inventors: Pierre-Marcel Genequand, Geneva; Philippe Schwab, Yverdon-Les-Bains, both of (CH)

(73) Assignee: CSEM Centre Suisse d'Electronique et de Microtechnique SA, Neuchatel (CH)

( * ) Notice: Subject to any disclaimer, the term of this patent is extended or adjusted under 35 U.S.C. 154(b) by 0 days.

(21) Appl. No.: 09/354,155

(22) Filed: Jul. 16, 1999

(30) Foreign Application Priority Data

Jul. 20, 1998 (FR) .................................................. 98 09219

(51) Int. Cl.⁷ ........................................................ F16F 1/34
(52) U.S. Cl. .......................... 267/161; 267/160; 464/91; 248/567
(58) Field of Search ...................... 267/158, 160, 267/161; 74/5 F; 248/565, 567, 590; 403/291; 29/436; 464/87, 88, 91, 92, 106, 147, 180, 185

(56) References Cited

U.S. PATENT DOCUMENTS

| 980,900 | * | 1/1911 | Ball . | |
|---|---|---|---|---|
| 1,795,765 | * | 3/1931 | Dickerson . | |
| 2,901,703 | * | 8/1959 | Plunkett | 324/155 |
| 2,907,563 | * | 10/1959 | Verde et al. | 267/1 |
| 3,073,584 | * | 1/1963 | Troeger | 267/1 |
| 3,188,071 | * | 6/1965 | Owen | 267/1 |
| 3,252,696 | * | 5/1966 | Friedel | 267/1 |
| 3,264,880 | * | 8/1966 | Fischel | 74/5 |
| 3,277,555 | * | 10/1966 | Kutash | 29/149.5 |
| 3,312,458 | * | 4/1967 | Bratt | 267/1 |
| 3,479,107 | * | 11/1969 | Blythe et al. | 350/6 |
| 3,545,286 | * | 12/1970 | Stenstrom | 73/517 |
| 3,620,088 | * | 11/1971 | Alford | 74/5 |
| 3,743,268 | * | 7/1973 | Heiland et al. | 267/160 |
| 4,077,236 | * | 3/1978 | Dalziel | 64/22 |
| 4,326,428 | * | 4/1982 | Bostwick et al. | 74/5 F |
| 4,499,778 | | 2/1985 | Westhaver et al. . | |
| 4,569,667 | * | 2/1986 | Hannibal et al. | 464/51 |
| 4,720,088 | * | 1/1988 | Tamura | 267/158 |
| 4,985,973 | * | 1/1991 | Yoshimura et al. | 29/173 |
| 5,265,853 | * | 11/1993 | Szirtes | 267/160 |
| 5,460,574 | * | 10/1995 | Hobaugh | 464/162 |
| 5,529,277 | | 6/1996 | Ostaszewski . | |
| 5,620,169 | * | 4/1997 | Payne | 267/160 |

FOREIGN PATENT DOCUMENTS

| 196 10 692 | | 9/1997 | (DE) . |
|---|---|---|---|
| 0163753 | * | 11/1985 | (EP) . |
| 2666630 | | 3/1992 | (FR) . |
| 2703415 | | 10/1994 | (FR) . |
| 2178851 | | 2/1987 | (GB) . |
| 58-61332 | * | 4/1983 | (JP) . |
| 62-231117 | * | 9/1987 | (JP) . |

* cited by examiner

Primary Examiner—Robert J. Oberleitner
Assistant Examiner—Melody M. Burch
(74) Attorney, Agent, or Firm—Connolly Bove Lodge & Hutz LLP

(57) ABSTRACT

A flexible pivot with internal pivoting axis comprises two stages that are symmetrical with respect to a median plane perpendicular to the pivoting axis and separated by an external circular recess containing the median plane, each stage comprising an outer annular interface connected by a plurality of radial, flexible guiding arms to a common intermediate cylinder having an axis that is the same as the internal pivoting axis.

9 Claims, 4 Drawing Sheets

FLEXIBLE PIVOT WITH INTERNAL PIVOTING AXIS

BACKGROUND OF THE INVENTION

1. Field of the Invention

The present invention relates to a flexible pivot with internal pivoting axis. It also relates to an assembly of a plurality of such pivots.

The term "flexible pivot with internal pivoting axis" pertains to a centered pivot corresponding to a kinematic pivot with a real pivoting axis that is located within the structure, as opposed to off-centered pivots corresponding to a kinematic pivot with a virtual pivoting axis located outside the structure, possibly at infinity, the motion then amounting to the motion of translation.

2. Description of the Prior Art

In the prior art, there is a known flexible pivot with internal pivoting axis, known as a cross-band pivot because the pivoting motion is obtained by flexible band-shaped elements positioned in orthogonal planes. However, this type of centered pivot is asymmetrical, which complicates its manufacture and raises problems of internal hyperstaticity. Another drawback lies in the structure of the added-on bands.

A second known centered pivot consists of a plurality of bands extending radially from the pivoting axis, a first set of bands being fixed while a second set is related to the object which is mobile in pivoting. Although it is monolithic and seamless, this other type of known centered pivot however has a structure that remains asymmetrical with all the negative consequences of such a structure on the load and the space requirement. Furthermore, the center of the pivot is completely occupied by material, and this may be a drawback, for example for the passage of an optical beam.

SUMMARY OF THE INVENTION

Thus, the technical problem to be resolved by the present invention is to propose a monolithic flexible pivot with internal pivoting axis that is seamless and without internal joints, leaving free the central passage and having maximum stability under load stresses for minimum space requirement.

The solution to the technical problem raised, according to the present invention, lies in the fact that the pivot has two stages that are symmetrical with respect to a median plane perpendicular to the pivoting axis and separated by an external circular recess containing the median plane, each stage comprising an annular interface connected by a plurality of radial, flexible guiding arms to a common intermediate cylinder having an axis that is the same as the internal pivoting axis.

Thus, the structure of the flexible pivot according to the invention is monolithic, symmetrical by its principle, stable and compact. Furthermore, the central part of the pivot, constituted by the interior of the intermediate cylinder, is unoccupied. In particular, it allows the passage of an optical beam in an application of the flexible pivot of the invention to a telescope.

The rotational travel of the flexible pivot that is an object of the invention is limited to a few degrees. It may be observed that, advantageously, the off-centering remains zero during rotation.

In order to increase the rotational travel of the pivot, it is provided according to the invention that the intermediate cylinder will be radially flexible. This arrangement indeed makes it possible to keep the distance between the internal pivoting axis and the annular interface constant over a greater range of travel, through the radial deformation of the intermediate cylinder.

According to one particular embodiment of the invention, the radial flexibility desired is obtained by the fact that the intermediate cylinder has annular undulations.

It is also possible to increase the rotational travel of the flexible pivot according to the invention by assembling several pivots so as to add up the intermediate distances of travel of each pivot. To this end, the invention proposes two types of assembling.

According to a first embodiment, the assembling is obtained by the stacking of flexible pivots, an annular interface of a pivot being fixed to the contiguous annular interface of a neighboring pivot.

According to a second embodiment, the assembling is obtained by the monolithic stacking of the flexible pivot, an annular interface of a pivot forming one piece with a contiguous annular interface of a neighboring pivot while the guiding arms and the intermediate cylinder of a pivot are separated from the contiguous guiding arm and intermediate cylinder of a neighboring pivot by an internal circular slot.

BRIEF DESCRIPTION OF THE DRAWINGS

The following description made with reference to the appended drawings, given by way of non-restrictive examples, will clearly show the content of the invention and the way in which it can be achieved.

FIG. 1b provides a top view of the flexible pivot of FIG. 1a.

MORE DETAILED DESCRIPTION

Figure 1A:
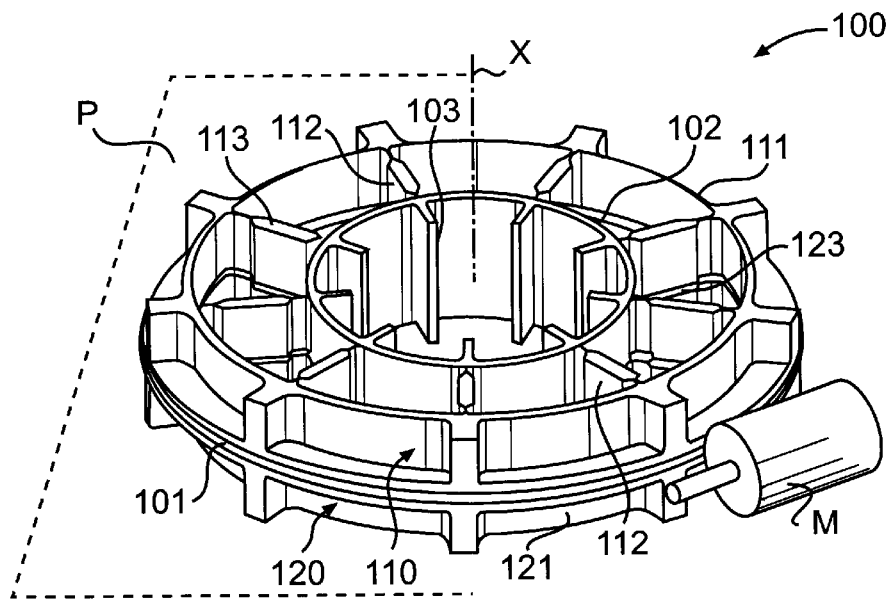
FIG. 1a provides a perspective view of the flexible pivot according to the invention.

FIG. 1a shows a view in perspective of a flexible pivot 100 with an internal pivoting axis X. The flexible pivot 100 has two stages 110, 120 that are symmetrical with respect to a median plane P perpendicular to the internal pivoting axis X, as can be seen more particularly in FIG. 1c.

The symmetrical stages 110, 120 are separated by a circular external recess 101 containing the median plane P. Each stage 110, 120 has an annular interface 111, 121 linked to an intermediate common cylinder 102, with an axis that is the same as the internal pivoting axis X, by a plurality of radial guiding arms 112, 122 that are flexible for rotation about the axis X but rigid for all the other degrees of freedom.

The flexible pivot of the invention is therefore completely monolithic and may be obtained in several ways: machining, milling, wire electroerosion or injection, without requiring any internal assembling.

Figure 1B:
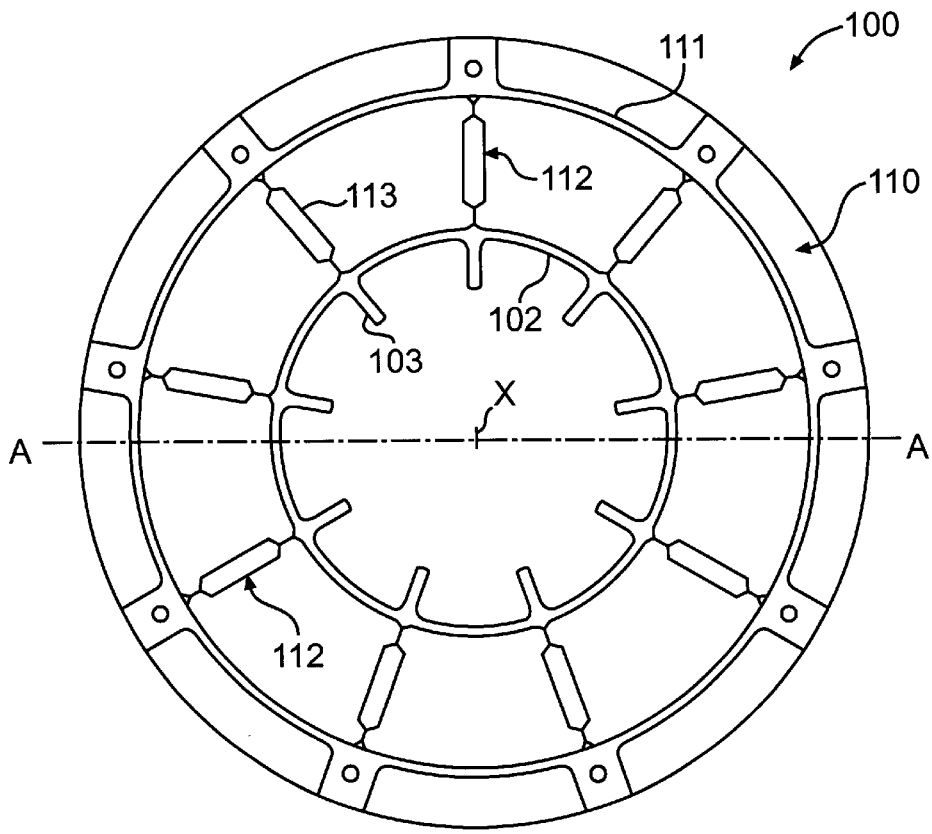
Figure 1C:
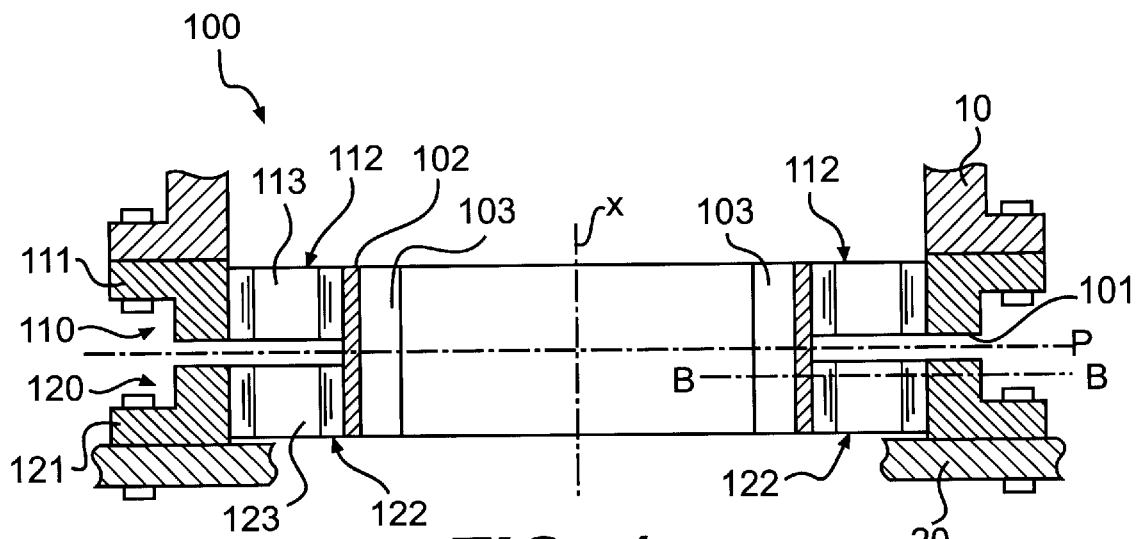
FIG. 1c provides a sectional side view, along the line A—A, of the flexible pivot of FIG. 1b as modified to obtain the pivot of FIG. 4.
Figure 2:
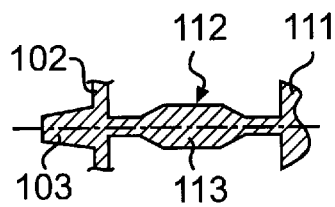
FIG. 2 provides a top sectional view, along the line B—B, of a guiding arm of the flexible pivot of FIG. 1c.

The flexible pivot of FIGS. 1a to 1c works as follows. The lower stage 120 is for example installed on a fixed base 20 by the annular interface 121 while the annular interface 111 of the upper stage 110 receives a mobile platform 10 designed to pivot with respect to the fixed base 20. A driving means diagrammatically represented by the motor M of FIG. 1a rotationally drives the interface 111 which can then pivot through the flexibility of the radial guiding arms 112.

The radial guiding arms 112, 122 may be simply formed by planar flexible bands passing through the internal axis X. However, as shown in FIGS. 1a, 1b, 1c and 2, it is advantageous for these bands to have a stiffening zone 113, 123 at the central part, these stiffening zones being obtained especially by wire electroerosion.

It can be seen in FIGS. 1a, 1b, 1c and 2 that there is an axial reinforcement piece 103 which, on the intermediate cylinder side 102, rigidly links each guiding arm 112 of a stage 110 to a guiding arm 122 of another stage 120, the axial reinforcement piece 103 having the function of forming a rigid link between the guiding arms of the two stages 110, 120.

Figure 3:
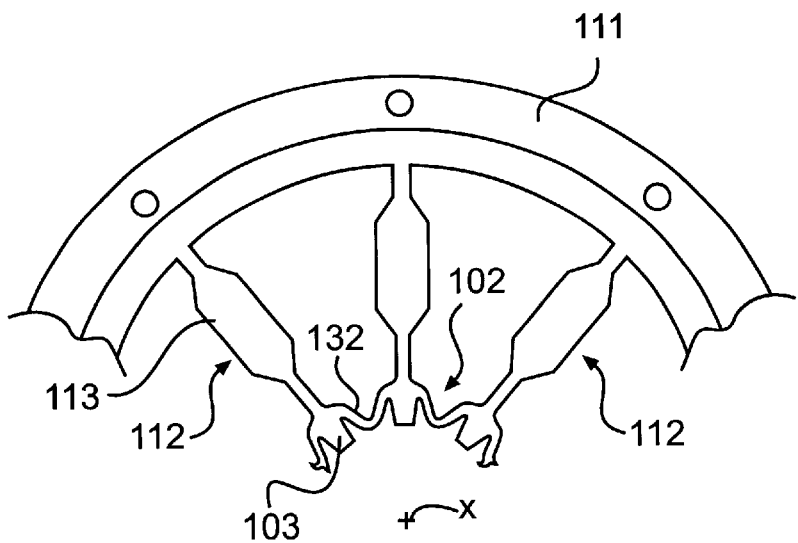
FIG. 3 provides a partial top view of an alternative embodiment of the flexible pivot according to the invention.

The maximum rotational travel of the flexible pivot 100 according to the invention is limited to a few degrees. However it could be substantially increased by reducing the diameter of the intermediate cylinder 102 with respect to that of the annular interfaces 111, 121. To this end, it is provided that the intermediate cylinder 102 will be radially flexible. More specifically, this radial flexibility is obtained through the fact that the intermediate cylinder 102 has annular undulations 132 which, as it happens, are compatible with machining by wire electroerosion (FIG. 3).

Another way of increasing the rotational travel of the flexible pivot 100 which is the object of the invention is to obtain assembly by stacking.

Figure 4:
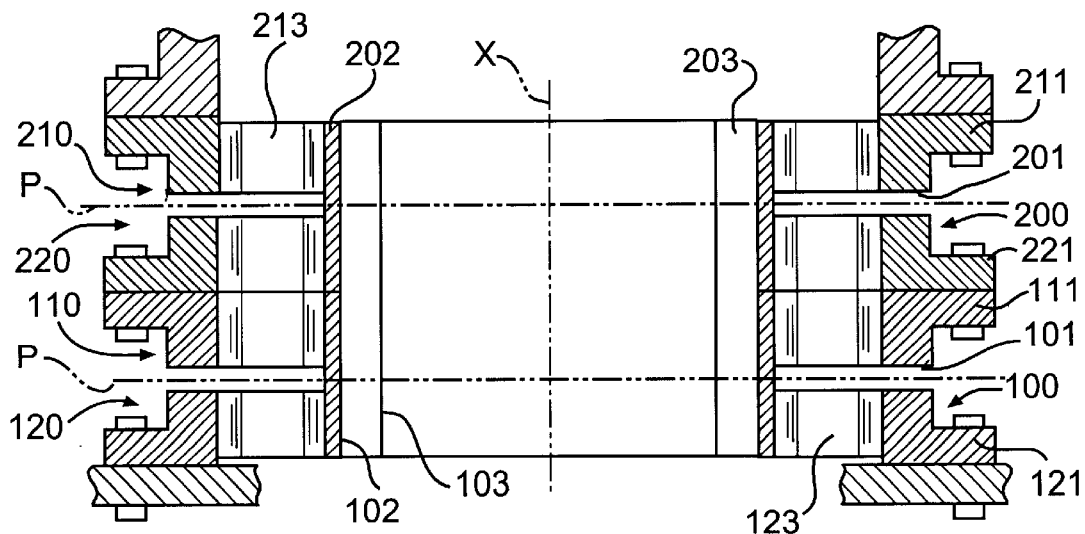
FIG. 4 provides a side sectional view of a first assembly of flexible pivots according to the invention.

A first type of stack is shown in FIG. 4 where, apart from the end annular interfaces 121, 211, an annular interface 111 of a flexible pivot 100 is fixed to the annular interface 221 contiguous to a neighboring pivot 200. Components 201, 210, 212 and 220 of pivot 200 correspond to respective components 101, 110, 112 and 120 of pivot 100. This structure, although it is not monolithic, has the advantage of being modular. The first type of stack corresponds to the stacking of several flexible pivots done according to the design of FIG. 1c so as to enable them to be fixed to each other.

Figure 5:
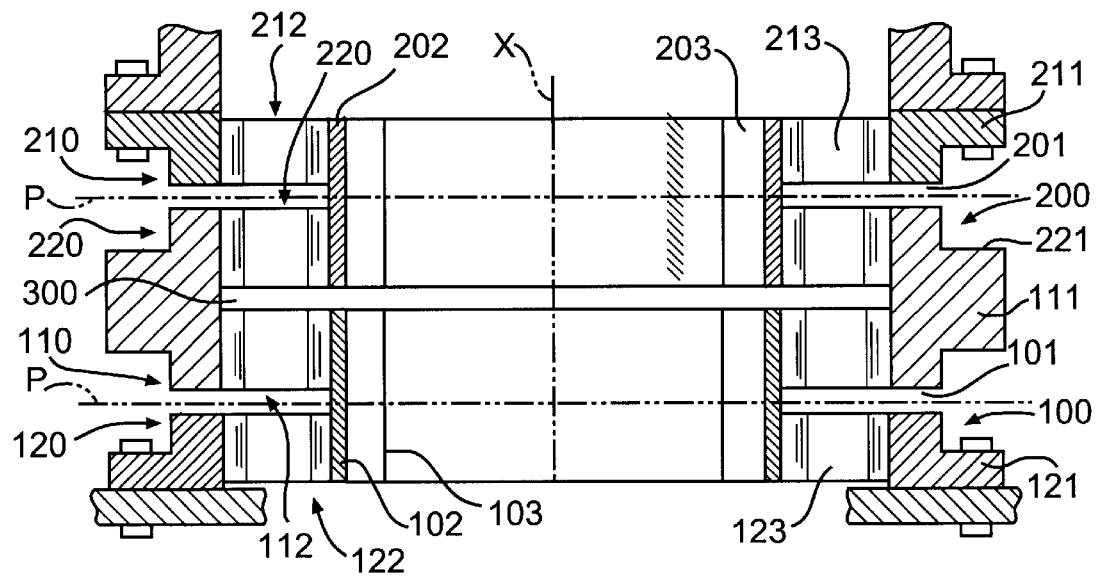
FIG. 5 provides a side sectional view of a second assembly of flexible pivots according to the invention.

The second type of stack shown in FIG. 5 consists of a monolithic stack of two flexible pivots 100, 200 that are identical, an annular interface 111 of a pivot 100 forming a single piece with the annular interface 221 contiguous to a neighboring pivot 200 while the guiding arms 112 and the intermediate cylinder 102 of a pivot 100 are separated from the guiding arms 222 and the contiguous intermediate cylinder 202 of a neighboring pivot 200 by an internal circular slot 300. Stiffening zone 213 corresponds to 123.

It must be noted that this monolithic stacking structure of two pivots is modular and may in turn be the object of a stacking.

Figure 6:
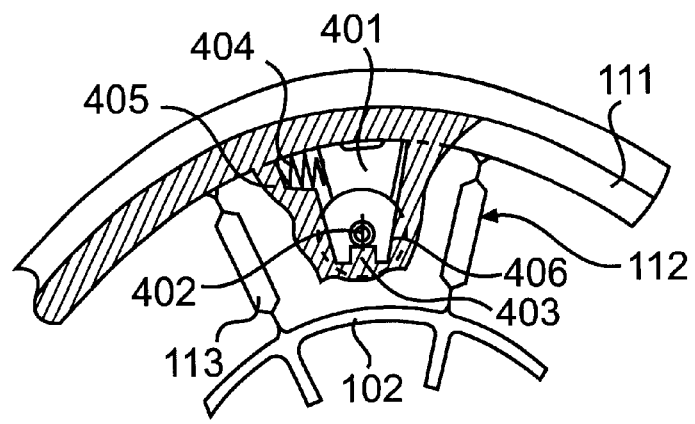
FIG. 6 provides a partial top view of a flexible pivot of the invention showing a first integrated driving mode.
Figure 7:
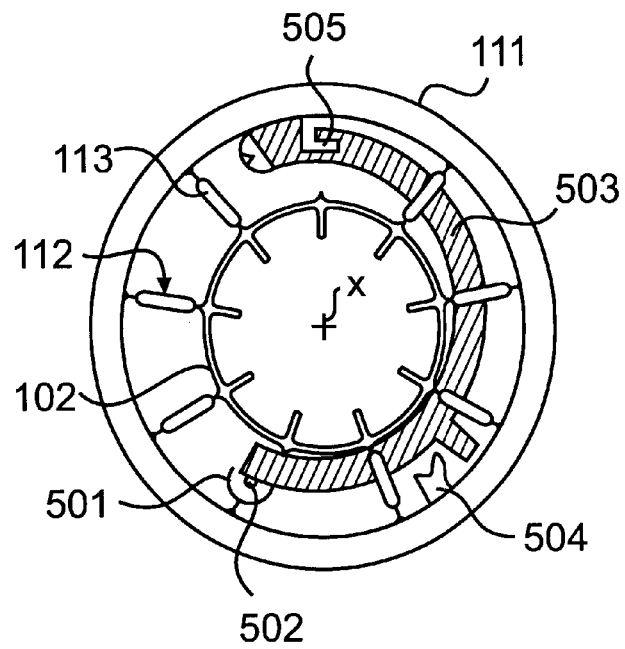
FIG. 7 provides a top view of a flexible pivot of the invention showing a second integrated driving mode.

Finally, as can be seen in FIGS. 6 and 7, the flexible pivot according to the invention has the advantage wherein it can integrate the driving device into its structure.

The type of driving shown in FIG. 6 includes a back-geared motor 401 provided with an axial pinion gear 402 that is meshed with a toothed sector 403 fixedly joined to the annular interface 111 by two members 405, 406. A pretensioning spring 404 provides compensation for play. The base of the back-geared motor 401 is fixedly joined to the annular interface 121 (not shown).

The second type of drive system shown in FIG. 7 is more particularly designed to obtain high resolution in the pivoting motion. A back-geared motor 501 fixed with respect to an annular interface 121 (not shown) is provided with a pinion gear 502 engaged with a first end of a reduction lever 503 slipped into the external circular recess 101. At another end, the reduction lever 503 drives a connection part 505 providing connection to the mobile annular interface 111. Again, a pretensioning spring 504 provides compensation for play.

What is claimed is:

1. A flexible pivot with a pivotal axis of symmetry, the pivot comprising:
    two stages that are symmetrical with respect to a median plane perpendicular to said pivotal axis;
    each stage including an outer annular interface connected to radially outward ends of a respective plurality of radial, flexible guiding arms located within the outer annular interface, the arms the other stage being coaxially spaced from corresponding arms of another stage;
    a circular recess extending through the annular interface and separating corresponding arms of the stages, the recess being located in the median plane for separating the stages; and
    inner ends of the arms of each stage being connected to a common intermediate cylinder located within the outer annular interface of each stage and having an axis common with the pivotal axis of symmetry.

2. A flexible pivot according to claim 1, wherein each radial flexible guiding arm is formed by a planar band lying in a plane that passes through the pivotal axis.

3. A flexible pivot according to claim 2, wherein said band has a stiffening zone in a central part thereof.

4. A flexible pivot according to claim 1 wherein the inward end of each guiding arm of one of the stages is rigidly connected to an inward end of the guiding arm of the other stage by a reinforcement member extending radially inwardly from an inner wall of the intermediate cylinder.

5. A flexible pivot according to claim 1 wherein said intermediate cylinder is radially flexible.

6. A flexible pivot according to claim 5, wherein the intermediate cylinder has annular undulations.

7. A flexible pivot according to claim 1 together with integrated driving devices.

8. An assembly of stacked flexible pivots with a common pivotal axis of symmetry, each pivot of the assembly comprising:
    two stages that are symmetrical with respect to a median plane perpendicular to said pivotal axis;
    each stage including an outer annular interface connected to radially outward ends of a respective plurality of radial, flexible guiding arms, the arms of one of the stages being coaxially spaced from corresponding arms of the other stage;
    a circular recess extending through the outer annular interface and separating corresponding arms of the stages, the recess being located in the median plane for separating the stages;
    inner ends of the arms of each stage being connected to a common intermediate cylinder located within the outer annular interface of each stage and having an axis common with the pivotal axis of symmetry; and
    means for attaching confronting surfaces of axially adjacent neighboring annular interfaces.

9. An assembly of monolithically stacked flexible pivots with a common pivotal axis of symmetry, each pivot of the assembly comprising:

two stages that are symmetrical with respect to a median plane perpendicular to said pivotal axis;

each stage including an outer annular interface connected to radially outward ends of a respective plurality of radial, flexible guiding arms, the arms of one of the stages being coaxially spaced from corresponding arms of the other stage;

a circular recess extending through the outer annular interface and separating corresponding arms of the stages, the recess being located in the median plane for separating the stages;

inner ends of the arms of each stage being connected to a common intermediate cylinder located within the outer annular interface of each stage and having a common axis with the pivotal axis of symmetry;

the annular interfaces of axially adjacent neighboring pivots being integrally formed while the guiding arms and the intermediate cylinder of neighboring pivots are separated by an internal circular slot.

* * * * *